(12) United States Patent
Borlick et al.

(10) Patent No.: US 9,747,139 B1
(45) Date of Patent: Aug. 29, 2017

(54) PERFORMANCE-BASED MULTI-MODE TASK DISPATCHING IN A MULTI-PROCESSOR CORE SYSTEM FOR HIGH TEMPERATURE AVOIDANCE

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Trung N. Nguyen, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/298,207

(22) Filed: Oct. 19, 2016

(51) Int. Cl.
*G06F 9/50* (2006.01)
*G06F 9/48* (2006.01)
*G06F 1/32* (2006.01)

(52) U.S. Cl.
CPC ............ *G06F 9/5094* (2013.01); *G06F 1/329* (2013.01); *G06F 9/4893* (2013.01); *G06F 9/5083* (2013.01)

(58) Field of Classification Search
CPC .... G06F 9/5094; G06F 9/4893; G06F 9/5083; G06F 1/329
See application file for complete search history.

(56) References Cited

U.S. PATENT DOCUMENTS

| | | |
|---|---|---|
| 7,784,050 B2 | 8/2010 | Harris |
| 7,793,291 B2 | 9/2010 | Arai et al. |
| 7,814,489 B2 | 10/2010 | Uemura et al. |
| 7,886,172 B2 | 2/2011 | Bose et al. |
| 8,051,276 B2 | 11/2011 | Krieger et al. |
| 8,284,205 B2 * | 10/2012 | Miller ................... G06F 1/3203 345/501 |

(Continued)

OTHER PUBLICATIONS

U.S. Appl. No. 15/298,217, filed Oct. 19, 2016.
List of IBM Patents or Patent Applications Treated as Related dated Oct. 20, 2016, pp. 2.

(Continued)

*Primary Examiner* — Benjamin Wu
(74) *Attorney, Agent, or Firm* — William K. Konrad; Konrad Raynes Davda & Victor LLP

(57) ABSTRACT

In one embodiment, performance-based multi-mode task dispatching for high temperature avoidance in accordance with the present description, includes selecting processor cores as available to receive a dispatched task. Tasks are dispatched to a set of available processor cores for processing in a performance-based dispatching mode. If monitored temperature rises above a threshold temperature value, task dispatching logic switches to a thermal-based dispatching mode. If a monitored temperature falls below another threshold temperature value, dispatching logic switches back to the performance-based dispatching mode. If a monitored temperature of an individual processor core rises above a threshold temperature value, the processor core is redesignated as unavailable to receive a dispatched task. If the temperature of an individual processor core falls below another threshold temperature value, the processor core is redesignated as available to receive a dispatched task. Other features and aspects may be realized, depending upon the particular application.

12 Claims, 8 Drawing Sheets

(56) References Cited

U.S. PATENT DOCUMENTS

| | | | | |
|---|---|---|---|---|
| 8,656,408 | B2* | 2/2014 | Elshishiny | G06F 9/4893 713/300 |
| 8,688,883 | B2* | 4/2014 | Guddeti | G06F 13/24 710/260 |
| 9,183,051 | B2 | 11/2015 | Inoue | |
| 9,261,949 | B2* | 2/2016 | Branover | G06F 1/3296 |
| 9,383,789 | B2* | 7/2016 | Lin | G06F 1/206 |
| 2005/0120252 | A1 | 6/2005 | Uwatoko | |
| 2008/0115010 | A1 | 5/2008 | Rothman et al. | |
| 2009/0083551 | A1 | 3/2009 | Finkelstein et al. | |
| 2009/0089792 | A1* | 4/2009 | Johnson | G06F 9/4881 718/105 |
| 2012/0271481 | A1* | 10/2012 | Anderson | G06F 1/206 700/299 |
| 2013/0074077 | A1* | 3/2013 | Miller | G06F 1/3203 718/100 |
| 2014/0089700 | A1 | 3/2014 | Chang et al. | |
| 2015/0046685 | A1* | 2/2015 | Park | G06F 1/3243 712/220 |
| 2015/0169363 | A1* | 6/2015 | Anderson | G06F 9/4893 718/103 |
| 2015/0178138 | A1* | 6/2015 | Saha | G06F 9/5094 718/104 |
| 2015/0233605 | A1 | 8/2015 | Bernhardt | |
| 2015/0346809 | A1 | 12/2015 | Kumar | |
| 2016/0124476 | A1* | 5/2016 | Mittal | G06F 1/3206 713/320 |

OTHER PUBLICATIONS

Office Action dated Jan. 3, 2017, pp. 15, for U.S. Appl. No. 15/298,217, filed Oct. 19, 2016.

Response dated Mar. 17, 2017, pp. 15, to Office Action dated Jan. 3, 2017, pp. 15, for U.S. Appl. No. 15/298,217, filed Oct. 19, 2016.

Notice of Allowance dated May 1, 2017, pp. 27, for U.S. Appl. No. 15/298,217, filed Oct. 19, 2016.

* cited by examiner

PERFORMANCE-BASED MULTI-MODE TASK DISPATCHING IN A MULTI-PROCESSOR CORE SYSTEM FOR HIGH TEMPERATURE AVOIDANCE

BACKGROUND OF THE INVENTION

1. Field of the Invention

The present invention relates to a computer program product, system, and method for performance-based multi-mode task dispatching in a multi-processor core system for high temperature avoidance.

2. Description of the Related Art

A computing system such as a storage controller, for example, may have many central processing unit (CPU) modules, often referred to collectively as a CPU complex. Each module may have multiple processor integrated circuit (IC) dies in which each IC die has multiple processor cores in a CPU.

A processing operation such as storing data in or reading data from storage may be broken into many tasks which may be distributed by a task scheduler to the various processor cores to be processed. In this manner, many of the tasks of the operation may be performed in parallel by processor cores of the CPU complex to improve system performance. Various logic implementations have been proposed or implemented for such task schedulers to optimize system performance.

A CPU complex may have one or more temperature sensors for monitoring the current temperature of areas of the CPU complex. Thus, an IC die of a CPU module of the CPU complex may have a temperature sensor disposed on the die and in some devices, each processor core of a CPU may have a temperature sensor to monitor the temperature of the associated processor core. Still further, the CPU complex may have a temperature sensor to monitor the current overall or ambient temperature of the CPU complex.

Due to various factors such as CPU load, device cooling failure, building cooling failure, and external environmental events such as heat waves, some or all of the CPUs of the CPU complex may overheat to an extent that causes CPU failure or severe performance degradation due to hardware thermal protection circuitry which can throttle back operating speeds. Accordingly, various logic implementations have been proposed or implemented for task schedulers to utilize sensor temperature data to distribute tasks in a manner which reduces or minimizes the temperature of each CPU or the average CPU temperature for safer operation.

SUMMARY

Performance-based multi-mode task dispatching for high temperature avoidance in a multi-processor core system in one aspect of the present description, includes methods which select a plurality of processor cores of a multi-processor core system, as available to receive a dispatched task, to define a set of available processor cores in which each processor core of the set of available processor cores is selected as available to receive a dispatched task. Tasks are dispatched by multi-mode task dispatching logic to processor cores of the set of available processor cores for processing in a performance-based dispatching mode primarily as a function of system performance. A multi-processor core temperature which is a function of temperatures of a plurality of processor cores, is monitored and compared to a first threshold temperature value. If the multi-processor core temperature rises above the first threshold temperature value, multi-mode task dispatching logic switches to a thermal-based dispatching mode which includes dispatching tasks to the set of available processor cores for processing by the processor cores in the thermal-based dispatching mode primarily as a function of processor core temperatures. Other embodiments include corresponding computer systems, apparatus, and computer programs recorded on one or more computer storage devices, each device being configured to perform the actions of the methods.

Implementations may also include one or more of the following features. The multi-processor core temperature may be compared to a second threshold temperature value lower than the first threshold value. If the multi-processor core temperature falls below the second threshold temperature value, the multi-mode task dispatching logic may switch back to the performance-based dispatching mode so that tasks are dispatched to the set of available processor cores for processing in the performance-based dispatching mode primarily as a function of system performance.

In another aspect of the present description, multi-mode task dispatching logic selects as a function of temperature, a plurality of the processor cores as unavailable to receive a dispatched task to define a second set of unavailable processor cores in which each processor core of the set of unavailable processor cores is selected as unavailable to receive a dispatched task. A temperature of a processor core of the set of available processor cores is monitored and compared to a third threshold temperature value. If the temperature of the processor core rises above the third threshold temperature value, the processor core is redesignated as unavailable to receive a dispatched task, is added to the set of unavailable processor cores, and is removed from the set of available processor cores.

In another aspect, a temperature of a processor core of the set of unavailable processor cores is monitored and compared to a fourth threshold temperature value. If the temperature of the processor core of the set of unavailable processor cores falls below the fourth threshold temperature value, the processor core of the set of unavailable processor cores is redesignated as available to receive a dispatched task, is added to the set of available processor cores, and is removed from the set of unavailable processor cores.

Implementations of the described techniques may include hardware, a method or process, or computer software on a computer-accessible medium. Other features and aspects may be realized, depending upon the particular application.

DETAILED DESCRIPTION

Figure 1:
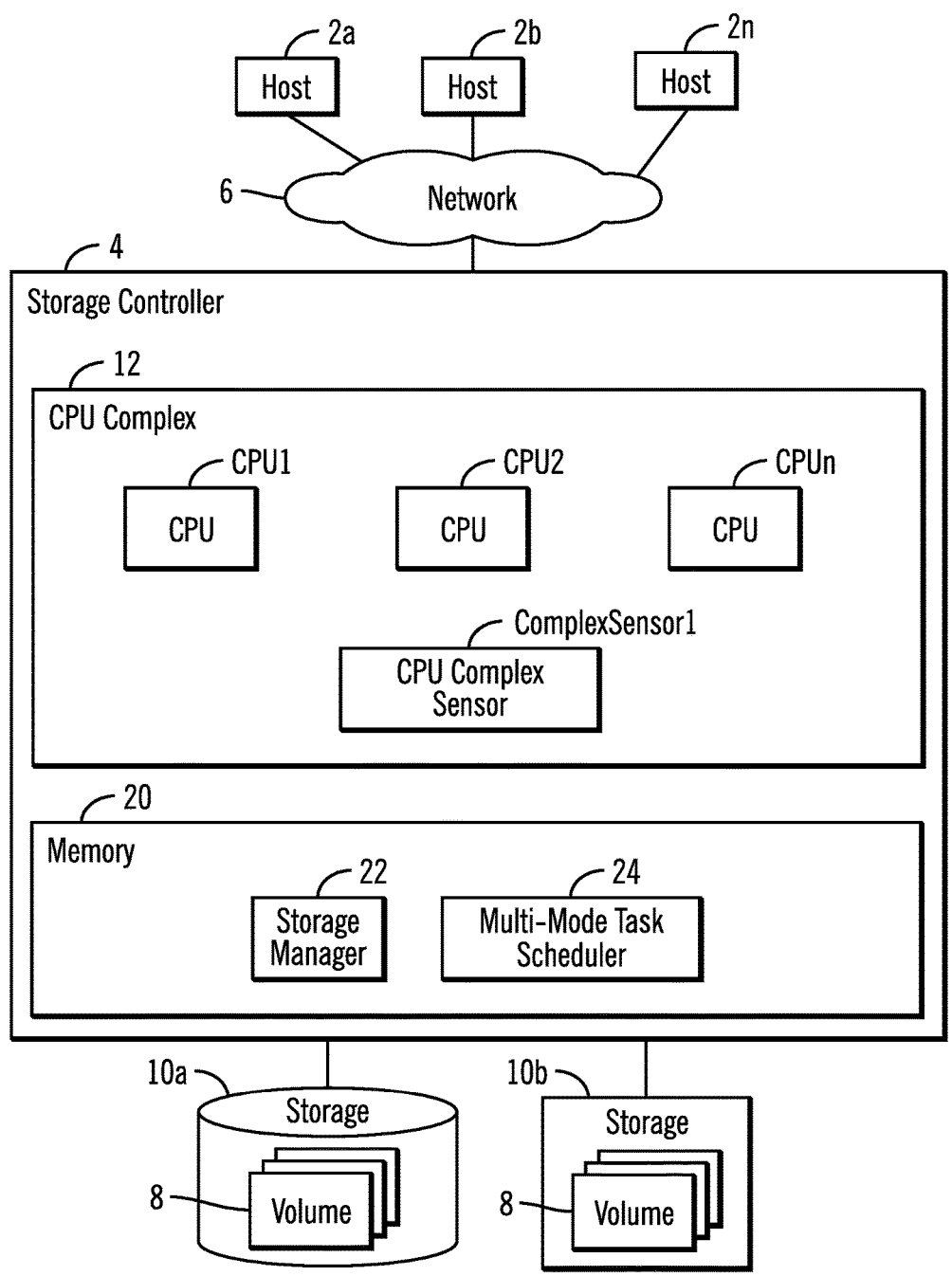
FIG. 1 illustrates an embodiment of a computing environment employing performance-based multi-mode task dispatching for high temperature avoidance in a multi-processor core system in accordance with one aspect of the present description.

A system of one or more computers may be configured for performance-based multi-mode task dispatching for high temperature avoidance in a multi-processor core system in accordance with the present description, by virtue of having software, firmware, hardware, or a combination of them installed on the system that in operation causes or cause the system to perform performance-based multi-mode task dispatching operations. For example, one or more computer programs may be configured to perform performance-based multi-mode task dispatching operations for high temperature avoidance in a multi-processor core system by virtue of including instructions that, when executed by data processing apparatus, cause the apparatus to perform the actions.

As noted above, various logic implementations have been proposed or implemented for task schedulers to utilize sensor temperature data to reduce or minimize the temperature of each CPU or the average CPU temperature. However, it is appreciated herein that these previously known thermal-based logic implementations are typically incompatible with dispatch logic implementations that optimize for performance. As a result, in many known dispatch logic implementations for temperature control, thermal optimization rather than system performance optimization is the primary factor if not the sole factor in determining to which CPUs tasks are to be dispatched.

In contrast, it is appreciated herein that for the majority of computer system operation time, it is advantageous for the task scheduler to employ a dispatch logic implementation that is optimized or substantially optimized for performance, particularly in high volume data operations such as those performed by commercial storage controllers. Nonetheless, it is also appreciated that in accordance with the present description, thermal data may yet be taken into consideration in dispatching tasks to the processor cores to prevent CPU failure due to thermal factors, while continuing to maintain high system performance as a primary factor for the task scheduler.

In one embodiment, performance-based multi-mode task dispatching for high temperature avoidance in a multi-processor core system in accordance with the present description, includes selecting as a function of individual processor core temperatures, processor cores as available to receive a dispatched task. Tasks are dispatched by multi-mode task dispatching logic to the set of available processor cores for processing in a performance-based dispatching mode. If a multi-processor core temperature which may be the overall temperature of a collection of processor cores, rises above a threshold temperature value, multi-mode task dispatching logic switches to a thermal-based dispatching mode. If the multi-processor core temperature falls below another threshold temperature value, multi-mode task dispatching logic switches back to the performance-based dispatching mode.

Within the performance-based dispatching mode, if the temperature of an individual processor core rises above a threshold temperature value, the processor core is redesignated as unavailable to receive a dispatched task. However, the multi-mode task dispatching logic remains in the performance-based dispatching mode for dispatching tasks to the remaining available processor cores to optimize or substantially optimize system performance. As a result, it is believed that the period of time that the multi-mode task dispatching logic remains in the performance-based mode is extended, notwithstanding that some of the processor cores may become unavailable to receive dispatched tasks due to excessive temperatures of those individual processor cores.

It is further appreciated that by redesignating a process core as unavailable to receive dispatched tasks due to an excessive temperature of the processor core, cooling of the processor core is facilitated. If the temperature of an individual processor core falls below another threshold temperature value, the processor core is redesignated as available to receive a dispatched task. Again, it is believed that the period of time that the multi-mode task dispatching logic remains in the performance-based mode is extended as unavailable processor cores are permitted to cool and are then added back to the set of available processor cores.

As used herein, the term performance-based dispatching mode includes a mode for dispatching tasks to the available processor cores to optimize or substantially optimize system performance. In another embodiment, the term performance-based dispatching mode includes a mode for dispatching tasks to the available processor cores in which one or more performance criteria are the primary factors for controlling the dispatching of tasks to the available processor cores to increase system performance as compared to that achieved with, for example, a thermal-based dispatching mode. For example, in one embodiment, tasks are dispatched to processor cores of the set of available of processor cores for processing by processor cores of the set of available processor cores primarily as a function of system performance instead of primarily as a function of temperatures of the available processor cores. Thus, tasks may be distributed to available processor cores in a manner which increases system throughput without regard to the individual temperatures of the available processor cores as long as they remain in the set of available processor cores. However, once the temperature of an individual processor core exceeds a certain threshold, that processor core is removed from the set of available processor cores in one embodiment of the present description.

It is appreciated that performance of a CPU complex may be measured using various criteria. For example, in a storage controller, system performance may be measured as a function of throughput of read and write operations from and to storage, in which higher throughput represents increased performance. Other examples of system performance criteria include time to complete a set of tasks or time to complete individual tasks, for example, in which reduced time represents an increase in system performance. It is appreciated that other system performance criteria may be utilized in a performance-based dispatching mode in accordance with the present description, depending upon the particular application.

As used herein, the term thermal-based dispatching mode includes a mode for dispatching tasks to the available processor cores to optimize or substantially optimize temperature control of the CPU complex instead of optimizing or substantially optimizing system performance. In another embodiment, the term thermal-based dispatching mode includes a mode for dispatching tasks to the available processor cores in which one or more thermal criteria are the primary factors for controlling the dispatching tasks to the available processor cores to increase temperature control as compared to, for example, that which may be achieved with a performance-based dispatching mode in which performance criteria are the primary factors. For example, tasks may be dispatched to processor cores of the set of available processor cores for processing primarily as a function of processor core temperatures in the thermal-based dispatching mode. Thus, in one embodiment, tasks may be dispatched to lower temperature processor cores rather than higher temperature processor cores, to reduce or prevent excessive temperatures of the higher temperature cores with no or less regard for performance results as compared to, for example, that which may be achieved with a performance-based dispatching mode in which performance criteria are the primary factors. Thus, in one embodiment, tasks may be dispatched first to the processor core having the lowest temperature, second to the core having the second-most low temperature, third to the core having third-most low temperature etc., with little or no regard to system performance.

It is appreciated that thermal aspects of a CPU complex may be measured using various criteria. For example, a total, average or ambient temperature of a CPU complex as a whole may be measured and controlled in a thermal-based dispatching mode. Other examples of system thermal criteria include a total or average temperature of a CPU module, a total or average temperature of a CPU, a total or average temperature of a set of processor cores, or a momentary or average temperature of a processor core, for example, may be measured and controlled in a thermal-based dispatching mode. It is appreciated that other system thermal criteria may be utilized in a thermal-based dispatching mode in accordance with the present description, depending upon the particular application.

Accordingly, performance-based multi-mode task dispatching can, in accordance with one aspect of the present description, facilitate increasing the amount of time that a task scheduler of a computer system is operated in a performance-based mode while preventing or reducing CPU failure due to thermal factors. In this manner high system performance may be maintained as a primary factor for the task scheduler while continuing to prevent or reduce CPU failure due to thermal factors. Other features and aspects may be realized, depending upon the particular application.

Figure 2:
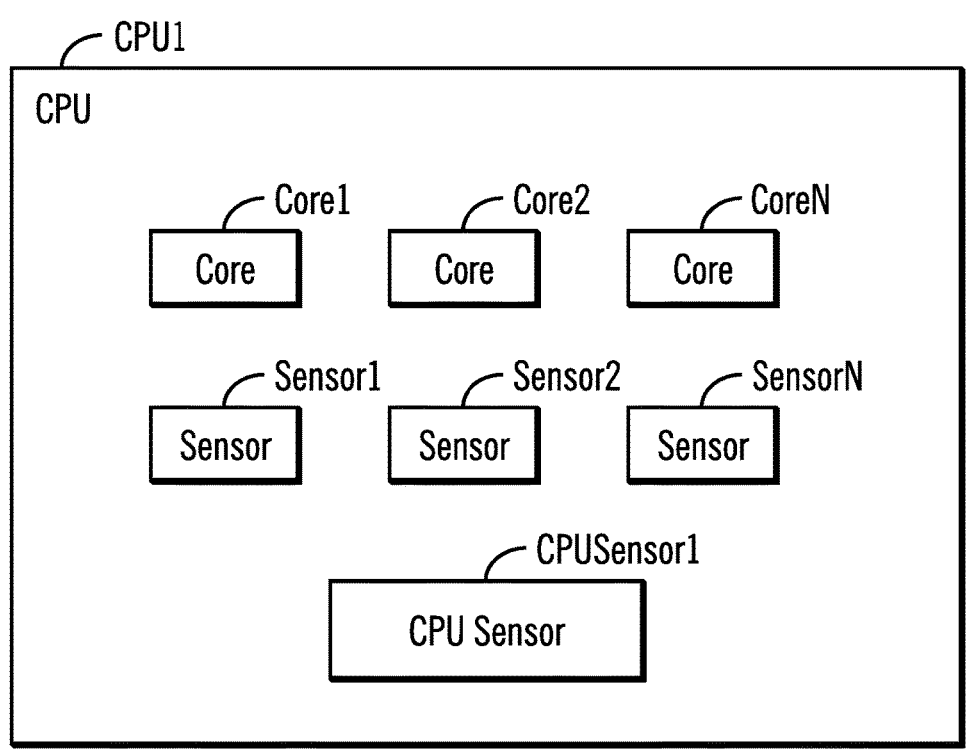
FIG. 2 illustrates an example of a CPU having multiple processor cores and multiple temperature sensors for the computing environment of FIG. 1.

Implementations of the described techniques may include hardware, a method or process, or computer software on a computer-accessible medium. FIG. 1 illustrates an embodiment of a computing environment employing performance-based multi-mode task dispatching for high temperature avoidance in a multi-processor core system in accordance with the present description. A plurality of hosts 2a, 2b . . . 2n may submit Input/Output (I/O) requests to a storage controller or storage control unit 4 over a network 6 to access data at volumes 8 (e.g., Logical Unit Numbers, Logical Devices, Logical Subsystems, etc.) in storage represented by a plurality of storage drives 10a, 10b. The storage controller 4 includes a CPU complex 12, including one or more processors or central processing units (CPUs) CPU1, CPU2 . . . CPUn, each having a single or multiple processor cores, core1, core2 . . . coreN as shown in FIG. 2. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

In one embodiment, each processor core of a central processing unit may have an associated temperature sensor, sensor1 (FIG. 2), sensor2 . . . sensorN, respectively thermally coupled to the associated processor core. For example, the sensor may be disposed on the same die and in close physical proximity to the associated processor core or may be coupled to the associated processor core by a suitable thermally conductive material. In one embodiment, each CPU may have an overall CPU sensor CPUsensor1 which is thermally coupled to the associated CPU and measures the overall temperature of the associated CPU. In another embodiment, each CPU may have an ambient CPU sensor CPUsensor1 which measures the ambient temperature of the environment surrounding an associated CPU. Still further, in one embodiment, the CPU complex 12 may have an overall CPU complex sensor ComplexSensor1 (FIG. 1) which is thermally coupled to the associated CPU complex 12 and measures the overall temperature of the associated CPU complex. In another embodiment, the CPU complex sensor ComplexSensor1 may be an ambient temperature sensor which measures the ambient temperature of the environment adjacent to or surrounding the CPU complex 12. Other embodiments may have sufficient sensors to measure both a temperature of the device itself and an ambient temperature of the environment of the device.

The storage controller 4 (FIG. 1) has a memory 20 that includes a storage manager 22 for managing the transfer of tracks transferred between the hosts 2a, 2b . . . 2n and the storage 10a, 10b and a task scheduler 24 that includes multi-mode task dispatching logic 304 (FIG. 3) configured to dispatch tasks to processor cores core1, core2 . . . coreN of the CPU complex 12 in a selected one of a plurality of task dispatching modes. As explained in greater detail below, the dispatch modes include a performance-based dispatching mode in which tasks are dispatched to available processor cores primarily as a function of system performance, and a thermal-based dispatching mode in which tasks are dispatched to available processor cores primarily as a function of processor core temperatures. It is appreciated that the multi-mode task dispatching logic 304 may include other modes of operation, depending upon the particular application.

A track may comprise any unit of data configured in the storage 10a, 10b, such as a track, Logical Block Address (LBA), etc., which is part of a larger grouping of tracks, such as a volume, logical device, etc. The storage manager 22 and task scheduler 24 are shown in FIG. 1 as program code loaded into the memory 20 and executed by the CPU complex 12. Alternatively, some or all of the functions may be implemented in hardware devices in the storage controller 4, such as in Application Specific Integrated Circuits (ASICs) or as firmware.

In one embodiment, the storage drives 10a, 10b may be comprised of one or more sequential access storage devices, such as hard disk drives and magnetic tape or may include non-sequential access storage devices such as solid state drives (SSD), for example. Each storage drive 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, etc. The network 6 may comprise a Storage Area Network (SAN), a Local Area Network (LAN), a Wide Area Network (WAN), the Internet, and Intranet, etc.

Figure 3:
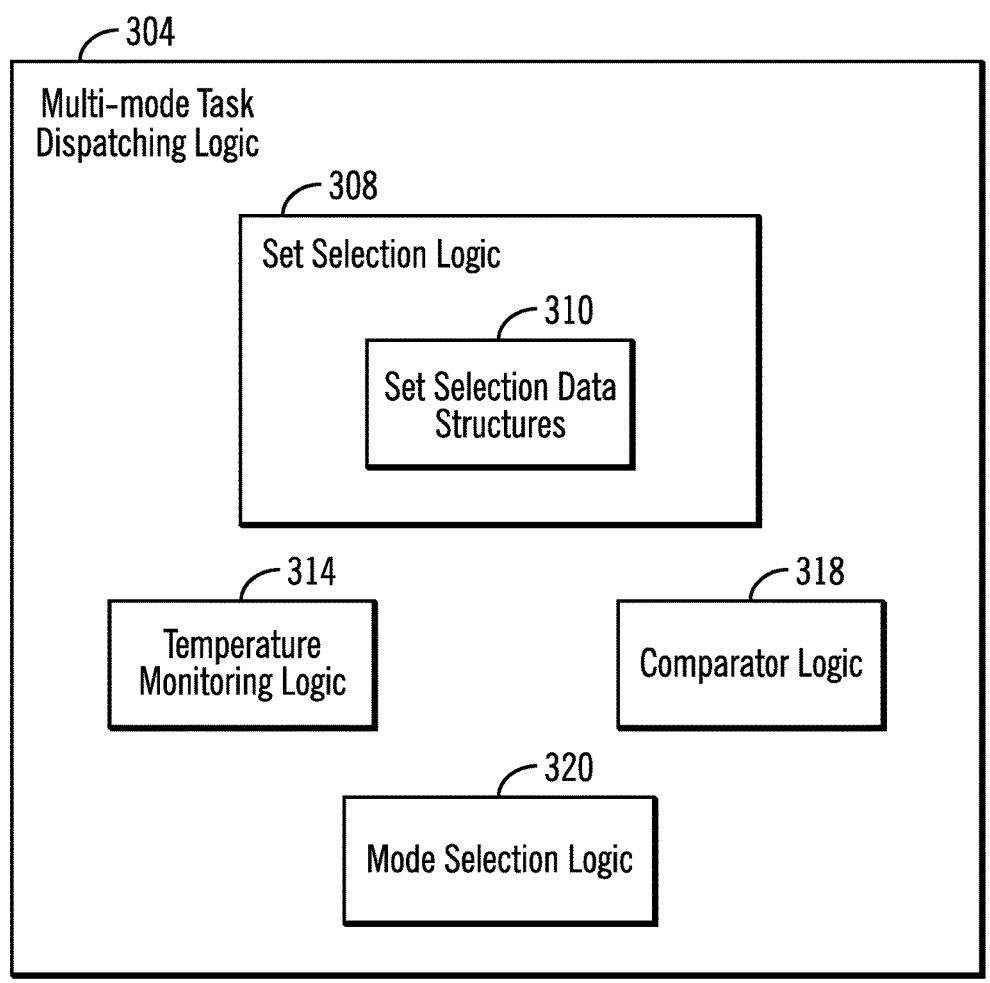
FIG. 3 illustrates an embodiment of multi-mode task dispatching logic configured for performance-based multi-mode task dispatching for high temperature avoidance in accordance with the present description.

FIG. 3 depicts one embodiment of multi-mode task dispatching logic 304 of the task scheduler 24 (FIG. 1). In this embodiment, the multi-mode task dispatching logic 304 is configured to dispatch tasks to available processor cores in a selected one of a plurality of dispatch modes. In one aspect of the present description, the multi-mode task dispatching logic 304 includes set selection logic 308 configured to select at least a portion of the plurality of processor as available to receive a dispatched task, to define a first set of available processor cores. One mode of the multi-mode task dispatching logic 304 is a performance-based dispatching mode in which tasks are dispatched to processor cores of the first set of available processor cores for processing, primarily as a function of system performance in the performance-based dispatching mode. In another dispatch mode, a thermal-based dispatching mode, tasks are dispatched to processor cores of the first set of available processor cores primarily as a function of processor core temperatures in the thermal-based dispatching mode. As explained in greater detail below, a processor core may be removed from the set of available processor cores if the temperature of the core rises to an excessive level. Conversely, a processor core may be returned to the set of available processor cores if the temperature of the core falls to an acceptable level. In this manner, tasks may continue to be dispatched to processor cores of the first set of available processor cores for processing in the performance-based dispatching mode while still taking into account the temperatures of individual processor cores in determining whether the processor cores are available or unavailable to receive performance-based dispatched tasks.

The identities of the available processor cores of the set of available processor cores defined by the set selection logic 308 may be maintained in a suitable data structure 310. It is appreciated that the identities of processor cores designated as available for receipt of dispatched tasks may be indicated using other techniques, depending upon the particular application.

The multi-mode task dispatching logic 304 further includes temperature monitoring logic 314 which is coupled to signal outputs of the temperature sensors sensor1, sensor2 . . . sensorN, CPUsensor1 (FIG. 2) and ComplexSensor1 (FIG. 1). The temperature monitoring logic 314 is configured to monitor a multi-processor core temperature using appropriate temperature sensors such that the multi-processor core temperature is a function of temperatures of at least a portion of the plurality of the processor cores of the system. A comparator logic 318 is configured to be responsive to the temperature monitoring logic 314, and to compare a multi-processor core temperature to a first threshold temperature value, such as the temperature threshold value1 depicted in the graph of FIG. 4.

The multi-mode task dispatching logic 304 further includes mode selection logic 320 (FIG. 3) configured to be responsive to the comparator logic 318 and to select a dispatch mode of the multi-mode task dispatching logic 304 as a function of a temperature or temperatures of processor cores. In one embodiment, the mode selection logic 320 is further configured to, if a multi-processor core temperature rises above the first threshold temperature value, that is, temperature threshold value1 (FIG. 4), to select the thermal-based dispatching mode and to switch at a mode transition T1, the mode of the multi-mode task dispatching logic 304 to the thermal-based dispatching mode so that tasks are dispatched to available processor cores of the set of available processor cores for processing primarily as a function of processor core temperatures in the thermal-based dispatching mode.

In one embodiment, the overall temperature of a CPU complex under load, such as the total temperature measured by the sensors or an average of the sensors of the CPU complex, may be in a range of 56-58 degrees Celsius, for example. However, if the overall temperature rises above 95 degrees Celsius, the CPUs may be damaged. Accordingly, in one embodiment a temperature value of 90 degrees Celsius may be selected for the temperature threshold value1. Thus, if the multi-processor core temperature being monitored rises above the 90 degree threshold temperature value, the dispatch mode of the multi-mode task dispatching logic 304 switches to the thermal-based dispatching mode so that tasks are dispatched to available processor cores of the set of available processor cores for processing primarily as a function of processor core temperatures in the thermal-based dispatching mode. It is appreciated that other temperature values may be selected for the threshold temperature values, depending upon the particular application.

For example, in another embodiment, the ambient temperature of a CPU complex under load, may be in a range of 20-26 degrees Celsius, for example. Ambient temperature is typically the air temperature of the environment in which the CPU complex is positioned. However, if the ambient temperature of the CPU complex rises substantially above 27 degrees Celsius, the CPUs may be damaged. Accordingly, in one embodiment an ambient temperature value of 27 degrees Celsius may be selected for the temperature threshold value1. Thus, if the ambient temperature of the CPU complex rises above the 27 degree threshold temperature value, the dispatch mode of the multi-mode task dispatching logic 304 can switch to the thermal-based dispatching mode so that tasks are dispatched to available processor cores of the set of available processor cores for processing primarily as a function of processor core temperatures in the thermal-based dispatching mode. It is appreciated that other temperature values may be selected for the threshold temperature values, depending upon the particular application.

Figure 4:
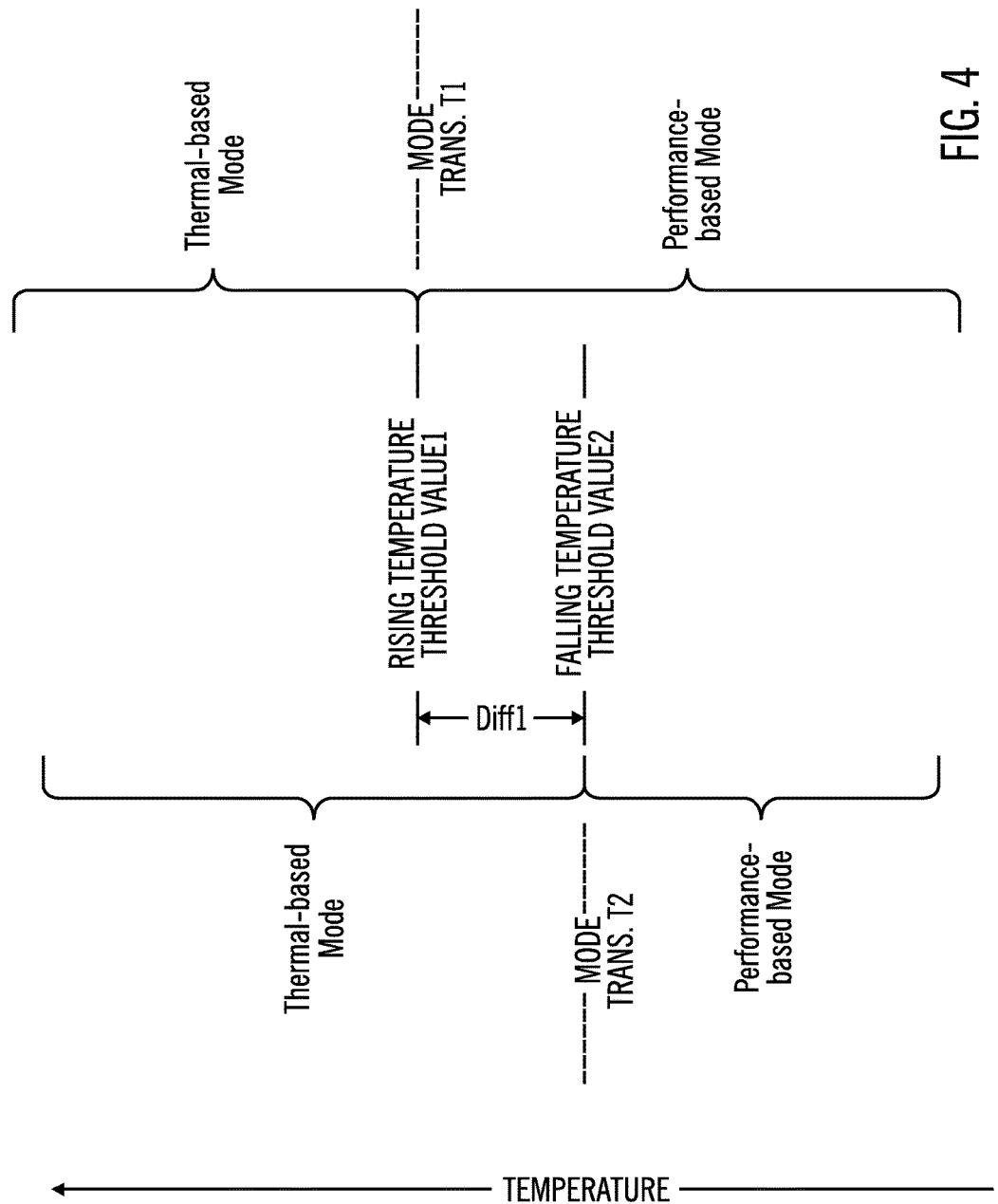
FIG. 4 is a graph depicting examples of temperature thresholds which may be employed by mode selection logic of the multi-mode task dispatching logic of FIG. 3.

In the embodiment of FIGS. 3, 4, the comparator logic 318 is further configured to compare a multi-processor core temperature to a second threshold temperature value such as the temperature threshold value2 (FIG. 4), for example, which is lower than the first threshold value. The mode selection logic 320 is further configured to, if the multi-processor core temperature falls below the second threshold temperature value2, to select the performance-based dispatching mode and switch at a mode transition T2, the mode of the multi-mode task dispatching logic from the thermal-based dispatching mode to the performance-based dispatching mode so that tasks are dispatched to available processor cores of the first set of available of processor cores for processing by available processor cores of the first set of available processor cores primarily as a function of system performance.

In one embodiment, the temperature monitoring logic 314 is further configured to monitor the total temperatures of all the processor cores which may be represented as a multi-processor core temperature. In another embodiment, the temperature monitoring logic 314 is further configured to monitor the average temperature of all the processor cores, which may also be represented as a multi-processor core temperature. In still another embodiment, the temperature monitoring logic 314 is further configured to monitor an ambient temperature of all the processor cores, which may also be represented as a multi-processor core temperature.

As previously mentioned, in one embodiment, the overall temperature of a CPU complex under load, such as the total temperature measured by the sensors or an average of the sensors of the CPU complex, may be in a range of 56-58 degrees Celsius, for example. However, if the overall temperature after rising above 90 degrees Celsius, for example, subsequently falls to a lower temperature such as 65 degrees Celsius, the danger of damage to the CPUs may be lessened in some embodiments. Accordingly, in one embodiment a temperature value of 65 degrees Celsius may be selected for the temperature threshold value2. Thus, if the multi-processor core temperature falls below the 65 degree threshold temperature value2, the dispatch mode of the multi-mode task dispatching logic 304 can switch back to the performance-based dispatching mode so that tasks are dispatched to processor cores of the set of available processor cores for processing primarily as a function of system performance in the performance-based dispatching mode. It is appreciated that other temperature values may be selected for the threshold temperature values, depending upon the particular application.

For example, in another embodiment, as noted above, the ambient temperature of a CPU complex under load, such as the total temperature measured by the sensors or an average of the sensors of the CPU complex, may be in a range of 20-26 degrees Celsius, for example. Accordingly, in one embodiment an ambient temperature value of 24 degrees Celsius, for example, may be selected for the temperature threshold value2. Thus, if the ambient multi-processor core temperature in this embodiment, after initially rising above the 27 degree threshold temperature value, subsequently falls below the 24 degree threshold value, the mode of the multi-mode task dispatching logic 304 may switch back to the performance-based dispatching mode so that tasks are dispatched to available processor cores of the set of available processor cores for processing primarily as a function of system performance in the performance-based dispatching mode. Again, it is appreciated that other temperature values may be selected for the threshold temperature values, depending upon the particular application.

In another aspect of the present description, the set selection logic 308 is further configured to select processor cores of the plurality of processor cores as unavailable to receive a dispatched task. In this manner, the set selection logic 308 defines a second set of unavailable processor cores in which each processor core of the second set of processor cores is selected as unavailable to receive a dispatched task. In this aspect, the temperature monitoring logic 314 is further configured to monitor a temperature of a particular processor core, and the comparator logic 318 is further configured to compare the temperature of the processor core to a third threshold temperature value, such as the temperature threshold value3 (FIG. 5), for example.

The set selection logic 308 in this embodiment is further configured to, if the temperature of the processor core rises above the third threshold temperature value3, to reselect the processor core as unavailable to receive a dispatched task. In this manner, the processor core is added at a set transition T3 to the second set of processor cores in which each processor core of the second set of processor cores is selected as unavailable to receive a dispatched task. Accordingly, the processor core is removed from the first set of available processor cores at the set transition T3.

In one embodiment, the value of the third threshold temperature value3 may be set to be the same as the first threshold temperature value1, such as 90 degrees Celsius, for example. It is appreciated that other temperature values may be selected depending upon the particular application.

The temperature monitoring logic 314 is further configured to monitor a temperature of a processor core of the second set of unavailable processor cores, and the comparator logic 318 is further configured to compare the temperature of the processor core of the second set of unavailable processor cores to a fourth threshold temperature value such as the temperature threshold value4 (FIG. 5), for example.

The set selection logic 308 is further configured to, if the temperature of the processor core of the second set of unavailable processor cores falls below the fourth threshold temperature value4, to reselect the second processor core as available to receive a dispatched task. In this manner, the set selection logic 308 adds the processor core at a set transition T4 to the set of available processor cores in which each processor core of the set of available processor cores is available to receive a dispatched task. Accordingly, the processor core is removed from the set of unavailable processor cores at the set transition T4.

In one embodiment, the value of the fourth threshold temperature value4 may be set to be the same as the second threshold temperature value2, such as 65 degrees Celsius, for example. It is appreciated that other temperature values may be selected depending upon the particular application.

Figure 6:
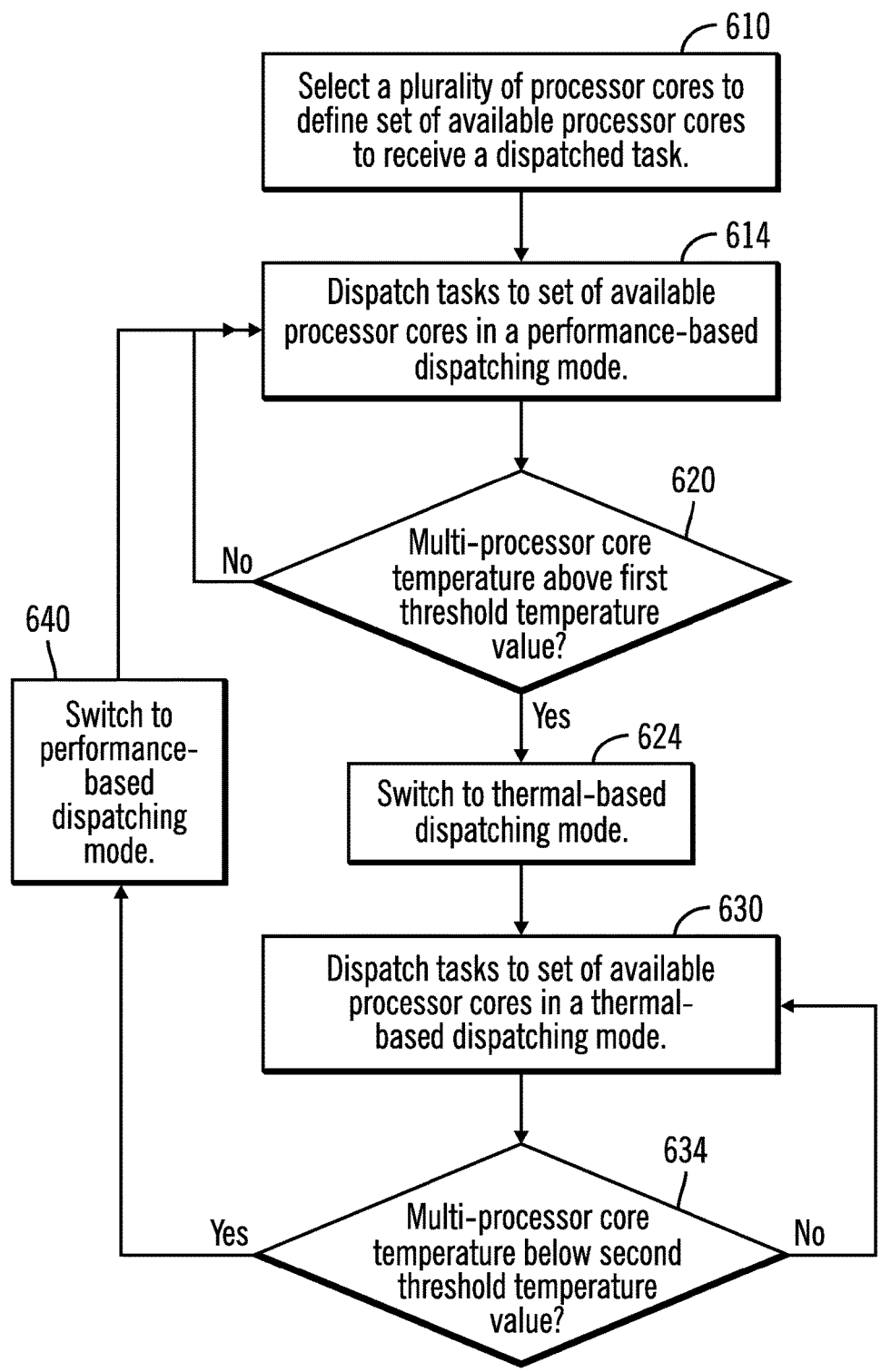
FIG. 6 depicts an example of operations of mode selection logic of the multi-mode task dispatching logic of FIG. 3.

FIG. 6 depicts one embodiment of operations of the multi-mode task dispatching logic 304. In this embodiment, the set selection logic 308 of the multi-mode task dispatching logic 304 selects (block 610) at least a portion of the plurality of processor as available to receive a dispatched task, to define a first set of available processor cores. The multi-mode task dispatching logic 304 dispatches (block 614) tasks to available processor cores in a selected one of a plurality of dispatching modes, which is initially the performance-based dispatching mode in this example. As previously mentioned, in one embodiment, a performance-based dispatching mode is one in which tasks are dispatched to processor cores of the first set of available processor cores for processing primarily as a function of system performance to optimize or substantially optimize system performance rather than primarily as a function of temperature data to optimize or substantially optimize overall temperature reduction of the CPU complex.

The comparator logic 318 compares (block 620) a multi-processor core temperature to a first threshold temperature value, such as the temperature threshold value1 depicted in the graph of FIG. 4. If the multi-processor core temperature remains below the first threshold temperature value, that is, temperature threshold value1 (FIG. 4), the mode selection logic 320 (FIG. 3) continues to select (block 614) the performance-based dispatching mode so that tasks are dispatched to available processor cores of the first set of available processor cores for processing primarily as a function of system performance to optimize or substantially optimize system performance rather than to optimize or substantially optimize overall temperature reduction of the CPU complex.

Conversely, if the multi-processor core temperature rises above the first threshold temperature value, that is, temperature threshold value1 (FIG. 4), the mode selection logic 320 (FIG. 3) selects the thermal-based dispatching mode and switches (block 624) the dispatch mode of the multi-mode task dispatching logic 304 at the mode transition T1 (FIG. 4), to the thermal-based dispatching mode. As previously mentioned, in a thermal-based dispatching mode, tasks are dispatched (block 630) to available processor cores of the set of available processor cores for processing primarily as a function of processor core temperatures to optimize or substantially optimize thermal management including overall temperature reduction of the CPU complex, rather than to optimize or substantially optimize system performance.

The comparator logic 318 further compares (block 634) the multi-processor core temperature to a second threshold temperature value such as the temperature threshold value2 (FIG. 4), for example, which is lower than the first threshold value. If the multi-processor core temperature falls below the second threshold temperature value2, the mode selection logic 320 selects the performance-based dispatching mode and switches (block 640) at a mode transition T2, the dispatch mode of the multi-mode task dispatching logic 304 from the thermal-based dispatching mode back to the performance-based dispatching mode. As a result, tasks are dispatched (block 614) to available processor cores of the first set of available of processor cores for processing by processor cores of the first set of available processor cores primarily as a function of system performance. Conversely, if the multi-processor core temperature remains above the second threshold temperature value2, the mode selection logic 320 remains (block 630) in the thermal-based dispatching mode. As a result, tasks are dispatched to processor cores of the first set of available of processor cores for processing by processor cores of the first set of available processor cores primarily as a function of thermal factors.

In the illustrated embodiment, a temperature differential diff1 (FIG. 4) is provided between the first and second temperature threshold values, value1 and value2. Such a differential can reduce excessive switching between dispatch modes in the event that a monitored temperature oscillates about a temperature close to one of the threshold values. Thus, if the multi-mode task dispatching logic 304 is in the thermal-based dispatching mode because the monitored multi-processor core temperature rose above the first threshold temperature value, that is, temperature threshold value1 (FIG. 4), the mode selection logic 320 (FIG. 3) continues to select the thermal-based dispatching mode notwithstanding that the monitored multi-processor core temperature falls below the temperature threshold value1 as long as the monitored multi-processor core temperature remains above the temperature threshold value2. Conversely, if the multi-mode task dispatching logic 304 is in the performance-based dispatching mode because the monitored multi-processor core temperature fell below the second threshold temperature value, that is, temperature threshold value2 (FIG. 4), the mode selection logic 320 (FIG. 3) continues to select the performance-based dispatching mode notwithstanding that the monitored multi-processor core temperature rises above the temperature threshold value2 as long as the monitored multi-processor core temperature remains below the temperature threshold value1.

As previously mentioned, in one embodiment, the temperature monitoring logic 314 can monitor the total temperatures of all the processor cores as a multi-processor core temperature. In another embodiment, the temperature monitoring logic 314 can monitor the average temperature of all the processor cores as a multi-processor core temperature. In yet another embodiment, the temperature monitoring logic 314 can monitor the ambient temperature of all the processor cores as a multi-processor core temperature.

In the illustrated embodiment, the comparator logic 318 is configured to compare monitored temperatures to temperature threshold values on a periodic basis. It is appreciated that other events may be used to trigger a comparison.

Figure 7:
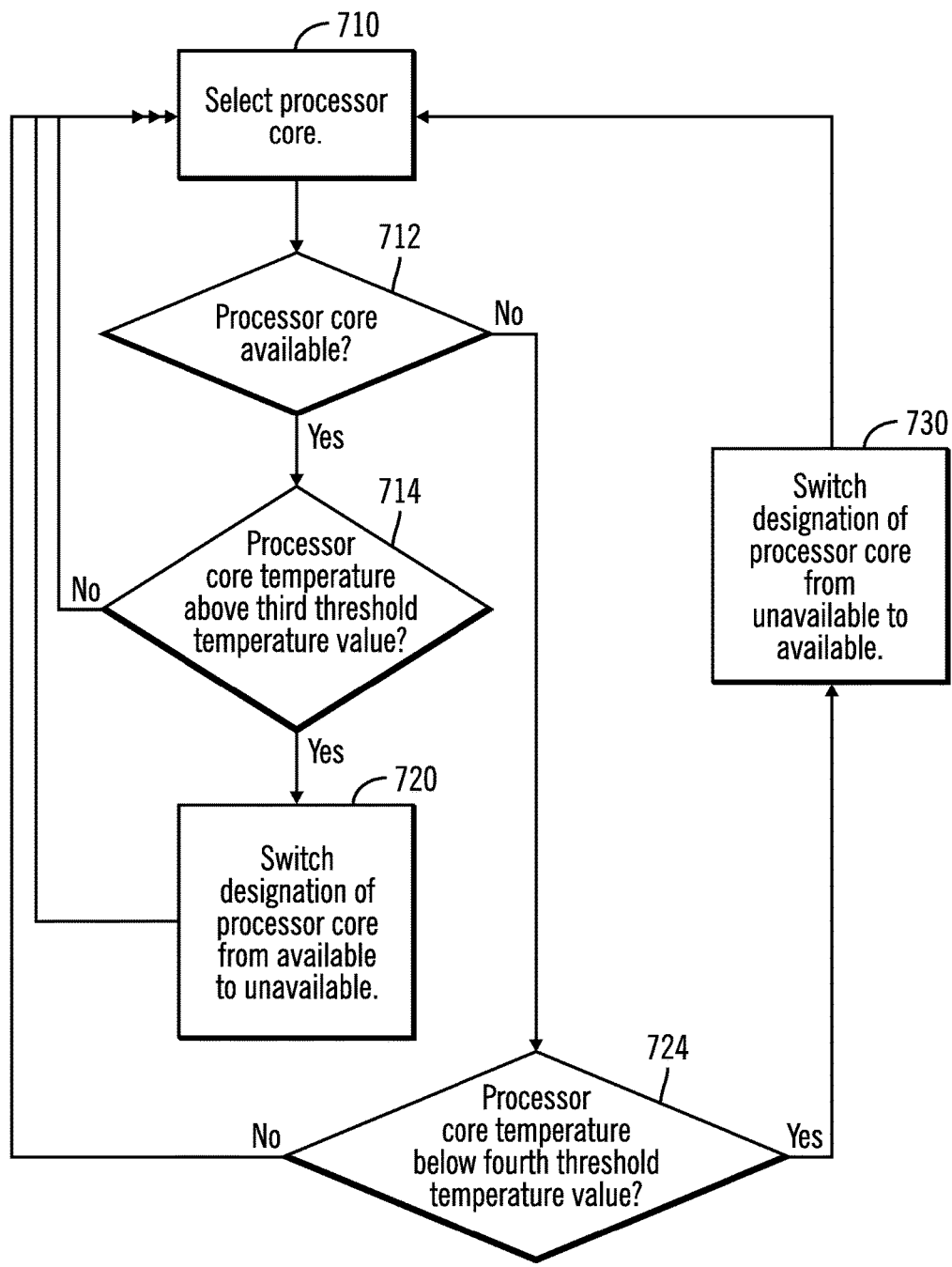
FIG. 7 depicts an example of operations of set selection logic of the multi-mode task dispatching logic of FIG. 3.

FIG. 7 depicts another embodiment of operations of the multi-mode task dispatching logic 304. In this embodiment, the set selection logic 308 (FIG. 3) initially selects at least a portion of the plurality of processor as available to receive a dispatched task. In this manner a first set of processor cores may be defined as available to receive a dispatched task. The identities of the set of available processor cores defined by the set selection logic 308 may be maintained in a suitable data structure 310. It is appreciated that processor cores may be indicated as available for receipt of dispatched tasks using other techniques, depending upon the particular application.

The set selection logic 308 (FIG. 3) selects (block 710) an individual processor core for temperature monitoring on an individual basis (as compared to collective monitoring of a multi-core processor temperature for multiple processor cores) and a determination (block 712) is made as to whether the selected processor core has been designated as available to receive dispatched tasks for processing by that processor core. If so, the comparator logic 318 compares (block 714) a monitored temperature of the selected processor core to a third threshold temperature value, such as the temperature threshold value3 depicted in the graph of FIG. 5.

If it is determined (block 712) that the selected processor core is already designated to be an available processor core, and if the temperature of the selected processor core has not risen above the third threshold temperature value, that is, temperature threshold value3 (FIG. 5), the set selection logic 308 (FIG. 3) selects the processor core to remain available to receive dispatched tasks. The set selection logic 308 (FIG. 3) selects (block 710) another individual processor core for temperature monitoring on an individual basis as described above.

Conversely, if it is determined (block 712) that the selected processor core is already designated as an available processor core, and if it is determined (block 714) that the temperature of the selected processor core has risen above the third threshold temperature value, that is, above temperature threshold value3 (FIG. 5), the set selection logic 308 (FIG. 3) selects the processor core to be unavailable to receive dispatched tasks and switches (block 720) the designation of the particular processor at the set transition T3 (FIG. 5), from an available designation to an unavailable designation. The set selection logic 308 (FIG. 3) selects (block 710) another individual processor core for temperature monitoring on an individual basis as described above.

Figure 5:
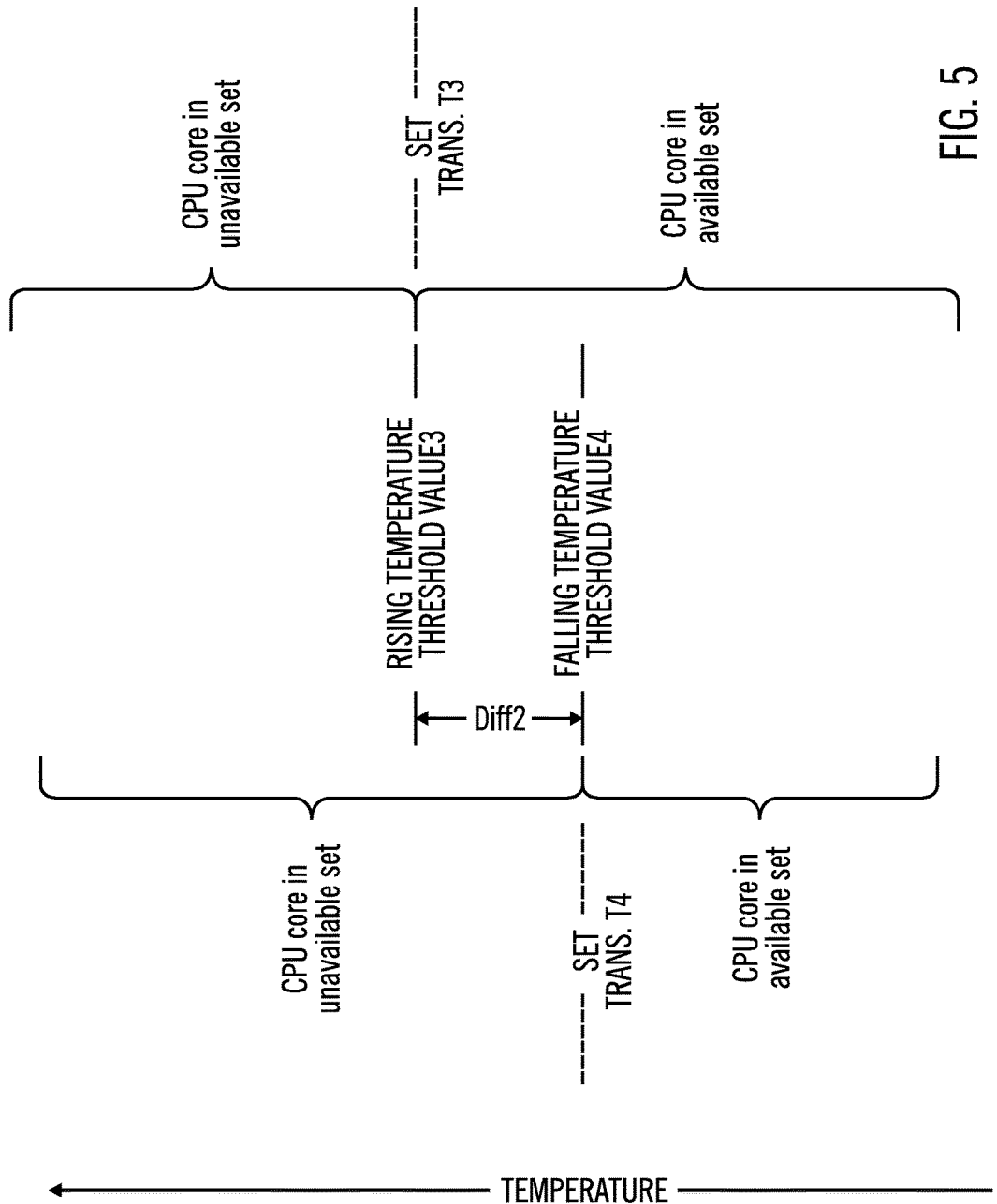
FIG. 5 is a graph depicting examples of temperature thresholds which may be employed by set selection logic of the multi-mode task dispatching logic of FIG. 3.

Conversely, if it is determined (block 712) that the selected processor core has not been designated to be an available processor core (that is, it has been designated as an unavailable processor core unavailable to receive dispatched tasks), the comparator logic 318 compares (block 724) the temperature of the particular core to a fourth threshold temperature value, such as the temperature threshold value4 depicted in the graph of FIG. 5. If the processor core temperature has not fallen below the fourth threshold temperature value, that is, below temperature threshold value4 (FIG. 5), the set selection logic 308 (FIG. 3) selects the processor core to remain unavailable to receive dispatched tasks and the set selection logic 308 (FIG. 3) selects (block 710) another individual processor core for temperature monitoring on an individual basis as described above.

Conversely, if it is determined (block 712) that the selected processor core has been designated to be an unavailable processor core, and if it is determined (block 724) that the processor core temperature has fallen below the fourth threshold temperature value, that is, below temperature threshold value4 (FIG. 5), the set selection logic 308 (FIG. 3) selects the processor core to be available to receive dispatched tasks and switches (block 730) the designation of the particular processor at the set transition T4 (FIG. 5), from an unavailable designation to an available designation. The set selection logic 308 (FIG. 3) selects (block 710)

another individual processor core for temperature monitoring on an individual basis as described above.

In the illustrated embodiment, a temperature differential diff2 (FIG. 5) is provided between the third and fourth temperature threshold values, value3 and value4, respectively. Such a differential can reduce excessive switching between sets in the event that a monitored temperature oscillates about a temperature close to one of the threshold values. Thus, if a particular processor core is in the available set of processor cores available to receive dispatched tasks because the monitored temperature fell below the fourth threshold temperature value, that is, temperature threshold value4 (FIG. 5), set selection logic 308 (FIG. 3) continues to designate that processor core as available notwithstanding that the monitored processor core temperature subsequently rises above the temperature threshold value4 as long as the monitored processor core temperature remains below the temperature threshold value3. Conversely, if a particular processor core is in the unavailable set of processor cores unavailable to receive dispatched tasks because the monitored temperature rose above the third threshold temperature value, that is, above temperature threshold value3 (FIG. 5), the set selection logic 308 (FIG. 3) continues to designate that processor core as unavailable notwithstanding that the monitored processor core temperature subsequently falls below the temperature threshold value4 as long as the monitored processor core temperature remains above the temperature threshold value3.

The set selection logic 308 continues to select a processor core for monitoring and designating or redesignating the processor core as having an available or unavailable status as appropriate. In one embodiment, once the last processor core has been monitored and designated or redesignated as appropriate, the set selection logic 308 can restart the process with the first processor core and monitor each individual processor again in turn. It is appreciated that the particular sequence in which individual processor cores are monitored may vary, depending upon the particular application.

As noted above, in the illustrated embodiment, the comparator logic 318 is configured to compare monitored temperatures to temperature threshold values on a periodic basis. It is appreciated that other events may be used to trigger a comparison.

Thus, processor cores may be removed from the set of available processor cores if the temperature of an individual processor core rises to an excessive level. Conversely, processor cores may be returned to the set of available processor cores if the temperature of an individual processor core falls to an acceptable level. In this manner, tasks may continue to be dispatched to processor cores of the set of available processor cores for processing in the performance-based dispatching mode while still taking into account the temperatures of processor cores in determining whether the processor cores are available or unavailable to receive dispatched tasks. Still further, tasks may continue to be dispatched to available processor cores of the set of available processor cores for processing in the performance-based dispatching mode while still taking into account the temperatures of processor cores in determining whether to switch to a thermal-based dispatching mode. In this manner, the amount of time the CPU complex spends in a performance-based dispatching mode, may be extended in many applications.

Figure 8:
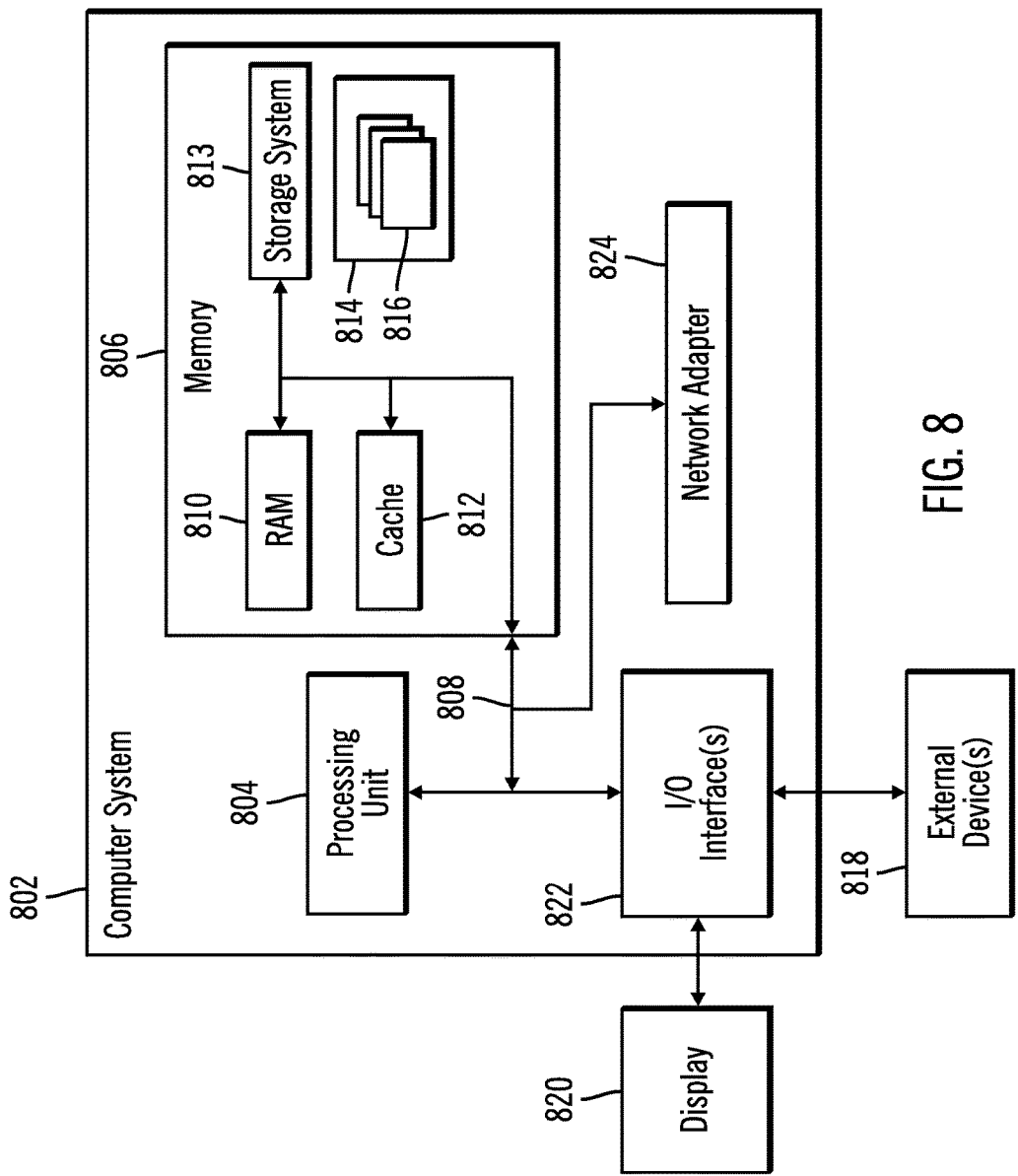
FIG. 8 illustrates a computer embodiment employing performance-based multi-mode task dispatching for high temperature avoidance in a multi-processor core system in accordance with the present description.

The computational components of the figures may each be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The system of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system, comprising:
   a plurality of processor cores; and
   multi-mode task dispatching logic configured to dispatch tasks to processor cores of the plurality of processor cores in a selected one of a plurality of modes, the multi-mode task dispatching logic including set selection logic configured to select at least a portion of the plurality of processor as available to receive a dispatched task to define a first set of available processor cores, wherein the plurality of modes includes a performance-based dispatching mode in which tasks are dispatched to processor cores of the first set of available processor cores for processing primarily as a function of system performance in the performance-based dispatching mode, and a thermal-based dispatching mode in which tasks are dispatched to processor cores of the first set of available processor cores primarily as a function of processor core temperatures in the thermal-based dispatching mode, the multi-mode task dispatching logic further including:
   temperature monitoring logic configured to monitor a multi-processor core temperature which is a function of temperatures of at least a portion of the plurality of the processor cores of the system;
   comparator logic configured to be responsive to the temperature monitoring logic, and to compare a multi-processor core temperature to a first threshold temperature value; and
   mode selection logic configured to be responsive to the comparator and to select a mode of the multi-mode task dispatching logic as a function of temperature of processor cores, wherein the mode selection logic is further configured to, upon determining that the multi-processor core temperature has risen above the first threshold temperature value, select the thermal-based dispatching mode and switch the mode of the multi-mode task dispatching logic to the thermal-based dispatching mode so that tasks are dispatched to processor cores of the first set of available processor cores for processing by processor cores of the first set of available processor cores primarily as a function of processor core temperatures in the thermal-based dispatching mode;
   wherein the comparator logic is further configured to compare a multi-processor core temperature to a second threshold temperature value lower than the first threshold value, and wherein the mode selection logic is further configured to, upon determining that the multi-processor core temperature has fallen below the second threshold temperature value, to select the performance-based dispatching mode and switch the mode of the multi-mode task dispatching logic to the performance-based dispatching mode so that tasks are dispatched to processor cores of the first set of available processor cores for processing by processor cores of the first set of available processor cores primarily as a function of system performance; and
   wherein the set selection logic is further configured to select processor cores of the plurality of processor cores as unavailable to receive a dispatched task to define a second set of unavailable processor cores in which each processor core of the second set of processor cores is selected as unavailable to receive a dispatched task, wherein the temperature monitoring logic is further configured to monitor a temperature of a first processor core of the first set of available processor cores, and wherein the comparator logic is further configured to compare the temperature of the first processor core to a third threshold temperature value, and wherein the set selection logic is further configured to, upon determining that the temperature of the first processor core has risen above the third threshold temperature value, to reselect the first processor core as unavailable to receive a dispatched task, so that the first processor core is added to the second set of processor cores in which each processor core of the second set of processor cores is selected as unavailable to receive a dispatched task, and is removed from the first set of available processor cores.

2. The system of claim 1 wherein the temperature monitoring logic is further configured to monitor a temperature of a second processor core of the second set of unavailable processor cores, and wherein the comparator logic is further configured to compare the temperature of the second processor core of the second set of unavailable processor cores to a fourth threshold temperature value; and wherein the set selection logic is further configured to, upon determining that the temperature of the second processor core of the second set of unavailable processor cores has fallen below the fourth threshold temperature value, to reselect the second processor core as available to receive a dispatched task so that the second processor core is added to the first set of processor cores in which each processor core of the first set of processor cores is selected as available to receive a dispatched task, and is removed from the second set of unavailable processor cores.

3. The system of claim 1 wherein the temperature monitoring logic is further configured to monitor the total temperatures of all the processor cores as a multi-processor core temperature.

4. The system of claim 1 wherein the temperature monitoring logic is further configured to monitor the average temperature of all the processor cores as a multi-processor core temperature.

5. A method, comprising:
selecting a plurality of processor cores of a multi-processor core system, as available to receive a dispatched task to define a first set of available processor cores in which each processor core of the first set of processor cores is selected as available to receive a dispatched task;
dispatching tasks to the first set of available processor cores for processing by the processor cores in the first set of processor cores in a performance-based dispatching mode primarily as a function of system performance;
monitoring a multi-processor core temperature which is a function of temperatures of a plurality of processor cores of the multi-processor core system;
comparing the multi-processor core temperature to a first threshold temperature value;
upon determining that the multi-processor core temperature has risen above the first threshold temperature value, switching to a thermal-based dispatching mode which includes dispatching tasks to the first set of processor cores for processing by the processor cores in the first set of processor cores in the thermal-based dispatching mode primarily as a function of processor core temperatures;
comparing the multi-processor core temperature to a second threshold temperature value lower than the first threshold value; and
upon determining that the multi-processor core temperature has fallen below the second threshold temperature value, switching to the performance-based dispatching mode so that tasks are dispatched to the first set of available processor cores for processing by the first set of available processor cores in the performance-based dispatching mode primarily as a function of system performance;
wherein the selecting includes:
selecting a plurality of the processor cores as unavailable to receive a dispatched task to define a second set of unavailable processor cores in which each processor core of the second set of processor cores is selected as unavailable to receive a dispatched task, wherein selecting processor cores to define a second set includes:
monitoring a temperature of a first processor core of the first set of available processor cores;
comparing the temperature of the first processor core to a third threshold temperature value; and
upon determining that the temperature of the first processor core has risen above the third threshold temperature value, reselecting the first processor core as unavailable to receive a dispatched task, wherein the reselecting of the first processor core includes adding the first processor core to the second set of processor cores in which each processor core of the second set of processor cores is selected as unavailable to receive a dispatched task, and removing the first processor core from the first set of available processor cores.

6. The method of claim 5 wherein selecting processor cores to define a first set includes:
monitoring a temperature of a second processor core of the second set of unavailable processor cores;
comparing the temperature of the second processor core of the second set of unavailable processor cores to a fourth threshold temperature value; and
upon determining that the temperature of the second processor core of the second set of unavailable processor cores has fallen below the fourth threshold temperature value, reselecting the second processor core of the second set of unavailable processor cores as available to receive a dispatched task wherein the reselecting of the second processor core includes adding the second processor core to the first set of processor cores in which each processor core of the first set of processor cores is selected as available to receive a dispatched task, and removing the second processor core from the second set of unavailable processor cores.

7. The method of claim 5 wherein the monitoring a multi-processor core temperature which is a function of temperatures of a plurality of processor cores of the multi-processor core system, includes monitoring the total temperatures of all the processor cores of the multi-processor core system.

8. The method of claim 5 wherein the monitoring a multi-processor core temperature which is a function of temperatures of a plurality of processor cores of the multi-processor core system, includes monitoring the average temperature of all the processor cores of the multi-processor core system.

9. A computer program product for use in a computer system having a processor comprising a plurality of processor cores in a multi-processor core system, a storage drive and a storage control unit configured to control read operations from and write operations to the storage drive, wherein the computer program product comprises a computer readable storage medium having program instructions embodied therewith, the program instructions executable by a processor of the multi-processor core system of the computer system to cause processor operations, the processor operations comprising:

selecting a plurality of processor cores as available to receive a dispatched task to define a first set of available processor cores in which each processor core of the first set of processor cores is selected as available to receive a dispatched task;

dispatching tasks to the first set of available processor cores for processing by the processor cores in the first set of processor cores in a performance-based dispatching mode primarily as a function of system performance;

monitoring a multi-processor core temperature which is a function of temperatures of a plurality of processor cores of the multi-processor core system;

comparing the multi-processor core temperature to a first threshold temperature value;

upon determining that the multi-processor core temperature has risen above the first threshold temperature value, switching to a thermal-based dispatching mode which includes dispatching tasks to the first set of processor cores for processing by the processor cores in the first set of processor cores in the thermal-based dispatching mode primarily as a function of processor core temperatures;

comparing the multi-processor core temperature to a second threshold temperature value lower than the first threshold value; and upon determining that the multi-processor core temperature has fallen below the second threshold temperature value, switching to the performance-based dispatching mode so that tasks are dispatched to the first set of available processor cores for processing by the first set of available processor cores in the performance-based dispatching mode primarily as a function of system performance;

wherein the selecting includes:
    selecting a plurality of the processor cores as unavailable to receive a dispatched task to define a second set of unavailable processor cores in which each processor core of the second set of processor cores is selected as unavailable to receive a dispatched task, wherein selecting processor cores to define a second set includes:

monitoring a temperature of a first processor core of the first set of available processor cores;

comparing the temperature of the first processor core to a third threshold temperature value; and upon determining that the temperature of the first processor core has risen above the third threshold temperature value, reselecting the first processor core as unavailable to receive a dispatched task, wherein the reselecting of the first processor core includes adding the first processor core to the second set of processor cores in which each processor core of the second set of processor cores is selected as unavailable to receive a dispatched task, and removing the first processor core from the first set of available processor cores.

10. The computer program product of claim 9 wherein selecting processor cores to define a first set includes:

monitoring a temperature of a second processor core of the second set of unavailable processor cores;

comparing the temperature of the second processor core of the second set of unavailable processor cores to a fourth threshold temperature value; and upon determining that the temperature of the second processor core of the second set of unavailable processor cores has fallen below the fourth threshold temperature value, reselecting the second processor core of the second set of unavailable processor cores as available to receive a dispatched task wherein the reselecting of the second processor core includes adding the second processor core to the first set of processor cores in which each processor core of the first set of processor cores is selected as available to receive a dispatched task, and removing the second processor core from the second set of unavailable processor cores.

11. The computer program product of claim 9 wherein the monitoring a multi-processor core temperature which is a function of temperatures of a plurality of processor cores of the multi-processor core system, includes monitoring the total temperatures of all the processor cores of the multi-processor core system.

12. The computer program product of claim 9 wherein the monitoring a multi-processor core temperature which is a function of temperatures of a plurality of processor cores of the multi-processor core system, includes monitoring the average temperature of all the processor cores of the multi-processor core system.

* * * * *